US012788664B2

(12) United States Patent
Kim et al.

(10) Patent No.: US 12,788,664 B2
(45) Date of Patent: Nov. 10, 2026

(54) WEARABLE DEVICE

(71) Applicants: Hyundai Motor Company, Seoul (KR); Kia Corporation, Seoul (KR)

(72) Inventors: Kyu Jung Kim, Seoul (KR); Hyun Seop Lim, Anyang-si (KR); Ju Young Yoon, Suwon-si (KR); Dong Hyun Lee, Ansan-si (KR); Beom Su Kim, Yongin-si (KR); Ho Jun Kim, Gunpo-si (KR); Dong Jin Hyun, Suwon-si (KR); Suk Hyung Jang, Siheung-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 868 days.

(21) Appl. No.: 17/982,053

(22) Filed: Nov. 7, 2022

(65) Prior Publication Data

US 2023/0404839 A1 Dec. 21, 2023

(30) Foreign Application Priority Data

Jun. 20, 2022 (KR) .......................... 1020220075076

(51) Int. Cl.
*A61H 3/00* (2006.01)
*A61H 1/02* (2006.01)
*A61H 3/02* (2006.01)

(52) U.S. Cl.
CPC ............. *A61H 3/00* (2013.01); *A61H 1/0244* (2013.01); *A61H 1/0262* (2013.01);
(Continued)

(58) Field of Classification Search
CPC .................... A61H 3/00; A61H 1/0262; A61H 1/0237–0288; A61H 2001/0248–027;
(Continued)

(56) References Cited

U.S. PATENT DOCUMENTS 6,305,395 B1 * 10/2001 Oledzki ................ A61H 3/008 135/68
10,537,987 B2 1/2020 Almesfer et al.
(Continued)

FOREIGN PATENT DOCUMENTS

CN 207941022 U 10/2018
CN 110695959 A 1/2020
(Continued)

*Primary Examiner* — Brandy S Lee
*Assistant Examiner* — Sara K Toich
(74) *Attorney, Agent, or Firm* — Fish & Richardson P.C.

(57) ABSTRACT

Disclosed is a wearable device including a link unit which has a shape corresponding to the lower extremities of the wearer and rotates in a front-rear direction, and a power supply unit. The link unit includes a right link unit fixed to the right lower extremity of the wearer and has a lower end that comes into contact with the ground, and a left link unit which is fixed to the left lower extremity of the wearer and has a lower end that comes into contact with the ground. A steering mode is provided to steer the link unit, and during the steering mode, i) the power supply unit supplies power to space the right link unit and the left link unit apart from each other, and then ii) the power supply unit supplies power in a direction to cause a unit to be rotated rearward.

17 Claims, 10 Drawing Sheets

(52) U.S. Cl.
CPC ............. *A61H 1/0266* (2013.01); *A61H 3/02* (2013.01); *A61H 2003/007* (2013.01); *A61H 2201/164* (2013.01); *A61H 2201/165* (2013.01); *A61H 2201/1671* (2013.01); *A61H 2201/503* (2013.01)

(58) Field of Classification Search
CPC ............ B25J 9/0006; A61F 2002/7625; A61F 2002/6827; A61F 2002/7645
See application file for complete search history.

(56) References Cited

U.S. PATENT DOCUMENTS

| | | | | |
|---|---|---|---|---|
| 2011/0301756 | A1* | 12/2011 | Yoshiike | B62D 57/032 901/1 |
| 2012/0172770 | A1* | 7/2012 | Almesfer | A61H 1/0255 601/23 |
| 2013/0158445 | A1* | 6/2013 | Kazerooni | A61H 3/00 601/35 |
| 2013/0237884 | A1* | 9/2013 | Kazerooni | A61H 1/00 601/34 |
| 2014/0212243 | A1* | 7/2014 | Yagi | B25J 9/0006 414/2 |
| 2016/0136477 | A1* | 5/2016 | Bucher | A63B 69/0064 482/4 |
| 2016/0229049 | A1* | 8/2016 | Angold | A61H 3/00 |
| 2016/0331624 | A1* | 11/2016 | Sankai | B25J 9/101 |
| 2017/0143573 | A1* | 5/2017 | Boulanger | A61H 1/024 |
| 2019/0008714 | A1 | 1/2019 | Murakami et al. | |
| 2019/0142681 | A1* | 5/2019 | Seo | A61H 3/00 601/5 |
| 2020/0008712 | A1* | 1/2020 | Takenaka | A61H 3/00 |
| 2022/0331189 | A1 | 10/2022 | Kim et al. | |

FOREIGN PATENT DOCUMENTS

| | | | |
|---|---|---|---|
| JP | 2011143002 | A | 7/2011 |
| JP | 2016064021 | A | 4/2016 |
| KR | 10-2012-0089439 | A | 8/2012 |
| KR | 10-2017-0082836 | A | 7/2017 |
| KR | 20170131747 | A | 11/2017 |
| KR | 20180090031 | A | 8/2018 |
| KR | 20180099050 | A | 9/2018 |
| KR | 10-2021-0156170 | A | 12/2021 |
| KR | 20220144031 | A | 10/2022 |

* cited by examiner

WEARABLE DEVICE

CROSS-REFERENCE TO RELATED APPLICATION(S)

This application claims priority from and the benefit of Korean Patent Application No. 10-2022-0075076, filed on Jun. 20, 2022, which is hereby incorporated by reference for all purposes as if set forth herein.

TECHNICAL FIELD

Exemplary implementations relate to a wearable device and, more specifically, to a wearable device capable of assisting a user in walking.

BACKGROUND

A wearable lower extremity assistive robot, which is worn on the lower extremities of a wearer to assist the wearer in walking, has a structure for assisting rotational force of the hip joint and rotational force of the knee joint of the wearer. Meanwhile, when a person walks, the hip joint and the knee joint rotate about the left-right direction of the wearer as a central axis. Thus, in the case of a wearable lower extremity robot according to the related art, both a part for assisting the rotational force of the hip joint and a part for assisting the rotational force of the knee joint are configured to rotate about the left-right direction as a central axis.

Therefore, according to the related art, the part for assisting the rotational force of the hip joint and the part for assisting the rotational force of the knee joint are configured to assist the wearer in straight-line walking. Accordingly, there is a limitation in that the assisting force cannot be provided when the wearer changes direction to the right or left.

The above limitation can be solved by mounting a separate structure that enables the wearer to change directions, but this may not only increase the weight and cost of a robot, but deteriorate the overall durability of the robot.

SUMMARY

Exemplary implementations of the present disclosure provide a wearable lower extremity assistive robot capable of changing directions with components that assist rotational force of the hip and knee joints of a wearer.

An exemplary implementation of the present disclosure provides a wearable device comprises: a link unit which has a shape corresponding to the lower extremities of the wearer and rotates in a front-rear direction of the wearer about a left-right direction of the wearer as a central axis; and a power supply unit configured to supply power for rotating the link unit, wherein the link unit includes: a right link unit which is fixed to the right lower extremity of the wearer and has a lower end that comes into contact with the ground; and a left link unit which is fixed to the left lower extremity of the wearer and has a lower end that comes into contact with the ground, wherein a steering mode is provided to steer the link unit to the left or right, and during the steering mode, i) the power supply unit supplies power to space the right link unit and the left link unit apart from each other in the front-rear direction, and then ii) the power supply unit supplies power in a direction to cause a unit, which is located relatively forward among the right link unit and the left link unit, to be rotated rearward, thereby steering the link unit in the left-right direction.

The steering mode may include a right steering mode, and during the right steering mode, i) the power supply unit may provide the power to move the left link unit forward, and then ii) the power supply unit may provide the power in a direction to cause the left link unit to be rotated rearward, thereby steering the link unit to the right.

The steering mode may include a left steering mode, and during the left steering mode, i) the power supply unit may provide the power to move the right link unit forward, and then ii) the power supply unit may provide the power in a direction to cause the right link unit to be rotated rearward, thereby steering the link unit to the left.

The steering mode may include a right steering mode, and during the right steering mode, i) the power supply unit may provide the power to move the right link unit rearward, and then ii) the power supply unit may provide the power in a direction to cause the left link unit to be rotated rearward, thereby steering the link unit to the right.

The steering mode may include a left steering mode, and during the left steering mode, i) the power supply unit may provide the power to move the left link unit rearward, and then ii) the power supply unit may provide the power in a direction to cause the right link unit to be rotated rearward, thereby steering the link unit to the left.

The right link unit may include: a first right link module which has one side facing the right hip joint of the wearer, extends downward from the one side, and rotates at the one side in the front-rear direction about the left-right direction of the wearer as a central axis; and a second right link module which has one side coupled to the first right link module, extends downward from the one side coupled to the first right link module, and rotates at the one side, which is coupled to the first right link module, in the front-rear direction about the left-right direction of the wearer as a central axis. The left link unit may include: a first left link module which has one side facing the left hip joint of the wearer, extends downward from the one side, and rotates at the one side in the front-rear direction about the left-right direction of the wearer as a central axis; and a second left link module which has one side coupled to the first left link module, extends downward from the one side coupled to the first left link module, and rotates at the one side, which is coupled to the first left link module, in the front-rear direction about the left-right direction of the wearer as a central axis.

The steering mode may include a right steering mode, and during the right steering mode, i) the power supply unit may provide the power to move the left link unit forward, and then ii) the power supply unit may provide the power in a direction to cause the first left link module to be rotated rearward about the one side of the first left link module, thereby steering the link unit to the right.

The steering mode may include a left steering mode, and during the left steering mode, i) the power supply unit may provide the power to move the right link unit forward, and then ii) the power supply unit may provide the power in a direction to cause the first right link module to be rotated rearward about the one side of the first right link module, thereby steering the link unit to the left.

The steering mode may include a right steering mode, and during the right steering mode, i) the power supply unit may provide the power to move the right link unit rearward, and then ii) the power supply unit may provide the power in a direction to cause the first left link module to be rotated rearward about the one side of the first left link module, thereby steering the link unit to the right.

The steering mode may include a left steering mode, and during the left steering mode, i) the power supply unit may provide the power to move the left link unit rearward, and then ii) the power supply unit may provide the power in a direction to cause the first right link module to be rotated rearward about the one side of the first right link module, thereby steering the link unit to the left.

The second right link module may include: a second-first right link module which has one side coupled to the first right link module, extends downward from the one side coupled to the first right link module, and rotates at the one side, which is coupled to the first right link module, in the front-rear direction about the left-right direction of the wearer as a central axis; and a second-second right link module which has one side coupled to the second-first right link module and rotates at the one side, which is coupled to the second-first right link module, in the front-rear direction about the left-right direction of the wearer as a central axis, wherein a lower surface of the second-second right link module comes into contact with the ground.

The second left link module may include: a second-first left link module which has one side coupled to the first left link module, extends downward from the one side coupled to the first left link module, and rotates at the one side, which is coupled to the first left link module, in the front-rear direction about the left-right direction of the wearer as a central axis; and a second-second left link module which has one side coupled to the second-first left link module and rotates at the one side, which is coupled to the second-first left link module, in the front-rear direction about the left-right direction of the wearer as a central axis, wherein a lower surface of the second-second left link module comes into contact with the ground.

The first right link module may extend from the right hip joint of the wearer to the right knee joint of the wearer, the first left link module may extend from the left hip joint of the wearer to the left knee joint of the wearer, the second-first right link module may extend from the right knee joint of the wearer to the right ankle joint of the wearer, the second-first left link module may extend from the left knee joint of the wearer to the left ankle joint of the wearer, the second-second right link module may extend from the right ankle joint of the wearer to the right sole of the wearer, and the second-second left link module may extend from the left ankle joint of the wearer to the left sole of the wearer.

The wearable device may further include a crutch member which has one side gripped by the wearer and the other side coming into contact with the ground, wherein the crutch member includes a steering button that performs the steering mode.

BRIEF DESCRIPTION OF THE DRAWINGS

The accompanying drawings, which are included to provide a further understanding of the present disclosure and are incorporated in and constitute a part of this specification, illustrate implementations of the present disclosure, and together with the description serve to explain the principles of the invention.

DETAILED DESCRIPTION

Hereinafter, a wearable device according to the present disclosure will be described with reference to the drawings.

Figure 1:
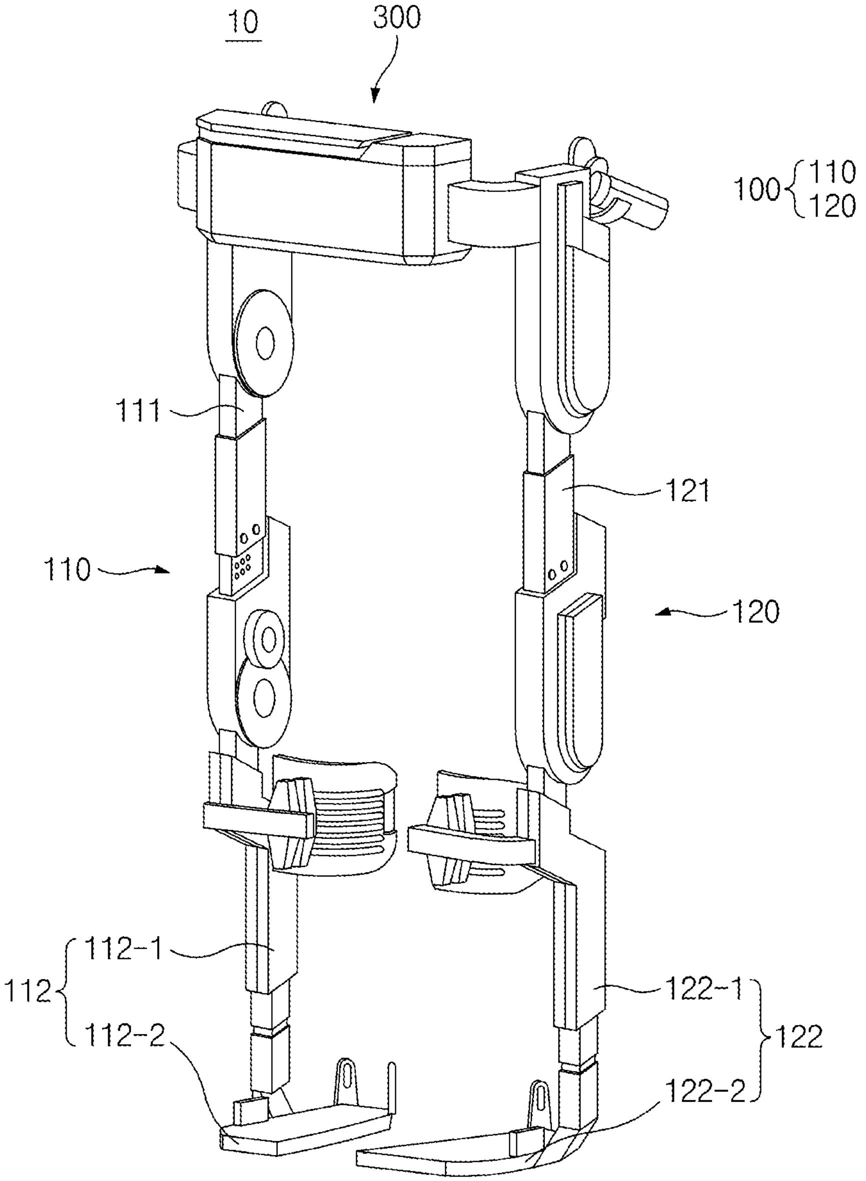
FIG. 1 is a perspective view illustrating an example of a wearable device according to the present disclosure.
Figure 2:
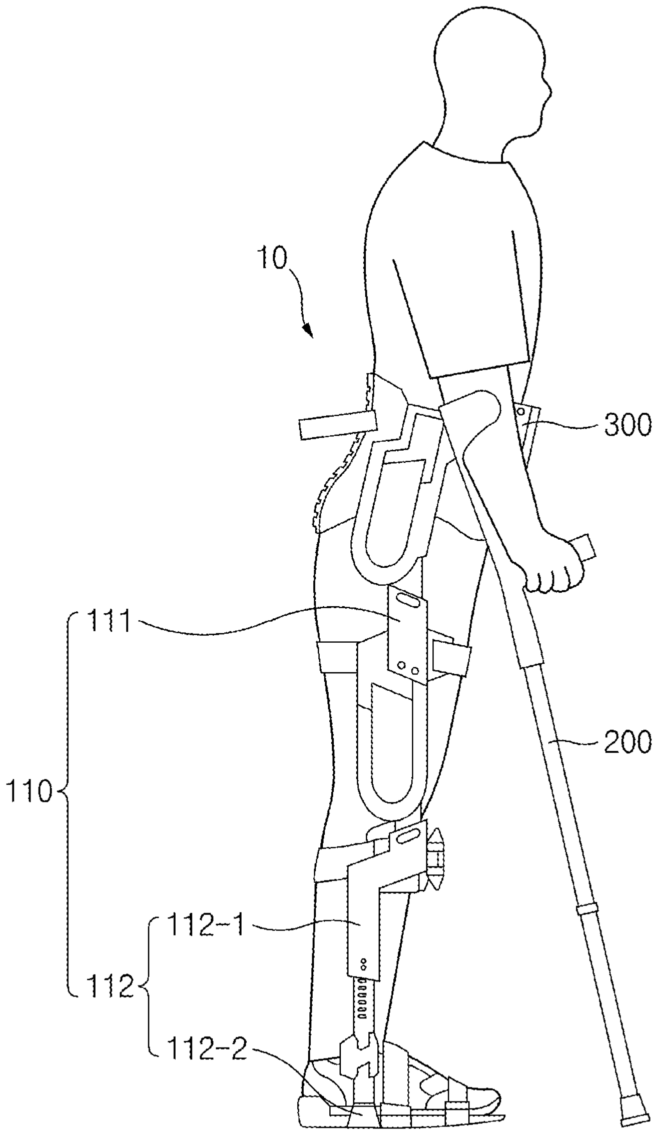
FIG. 2 is a side view illustrating a state in which a wearer wears the wearable device of FIG. 1.

FIG. 1 is a perspective view illustrating an example of a wearable device according to the present disclosure, and FIG. 2 is a side view illustrating a state in which a wearer wears the wearable device of FIG. 1.

The wearable device according to the present disclosure may be a device that is worn on the lower extremities of a wearer to assist the wearer in walking. That is, the shape of the wearable device before the wearer wears the wearable device may be different from the shape of the wearable device after the wearer wears the wearable device. Therefore, in this specification, for convenience of description, the configuration of the wearable device will be described on the basis of the appearance when the wearer wears the wearable device in order to satisfy the purpose of the wearable device according to the present disclosure. Therefore, the wearer will be mentioned below but used to describe the wearable device, and thus, it should be noted that the wearer, that is a person, is not an element that constitutes the wearable device according to the present disclosure.

Referring to FIGS. 1 and 2, when a wearer wears a wearable device 10 according to the present disclosure, the wearable device 10 may include a link unit 100, which has a shape corresponding to the lower extremities of the wearer and rotates in a front-rear direction of the wearer about a left-right direction of the wearer as a central axis, and a power supply unit, which supplies power for rotating the link unit. The link unit 100 and the power supply unit may be configured to assist a rotation axis of the joint formed on the lower extremity of the wearer, that is, the rotational force for rotating the hip joint and the knee joint which will be described later. Meanwhile, in the present specification, the feature, in which the central axis is formed in the left-right direction of the wearer, does not necessarily mean that the central axis extends in the left-right direction while being parallel to the ground. This feature may be interpreted as including the case in which the extension direction of the central axis of rotation of the hip and knee joints of the wearer and the extension direction of the central axis of the link unit 100 are similar to each other enough to assist the rotational force of the hip and knee joints of the wearer. In one example, the power supply unit may include an electric motor.

More specifically, the link unit 100 may include a right link unit 110, which is fixed to the right lower extremity of the wearer and has a lower end that comes into contact with the ground, and a left link unit 120, which is fixed to the left lower extremity of the wearer and has a lower end that comes into contact with the ground.

Each of the right link unit 110 and the left link unit 120 may include a plurality of link modules that are coupled so as to be rotatable relative to each other. More specifically, the right link unit 110 may include: a first right link module 111 which has one side facing the right hip joint of the wearer, extends downward from the one side, and rotates at the one side in the front-rear direction about the left-right direction of the wearer as a central axis; and a second right link module 112 which has one side coupled to the first right link module 111, extends downward from the one side coupled to the first right link module 111, and rotates at the one side, which is coupled to the first right link module 111, in the front-rear direction about the left-right direction of the wearer as a central axis. The power supply unit may supply the rotational force for rotating the first right link module 111 and thus may assist the rotational force for rotating the right hip joint of the wearer. The first right link module 111 may face the right thigh of the wearer.

Also, similar to the right link unit 110, the left link unit 120 may include: a first left link module 121 which has one side facing the left hip joint of the wearer, extends downward from the one side, and rotates at the one side in the front-rear direction about the left-right direction of the wearer as a central axis; and a second left link module 122 which has one side coupled to the first left link module 121, extends downward from the one side coupled to the first left link module 121, and rotates at the one side, which is coupled to the first left link module 121, in the front-rear direction about the left-right direction of the wearer as a central axis. The power supply unit may supply the rotational force for rotating the first left link module 121 and thus may assist the rotational force for rotating the left hip joint of the wearer. The first left link module 121 may face the left thigh of the wearer.

Continuing to refer to FIGS. 1 and 2, the second right link module 112 may include: a second-first right link module 112-1 which has one side coupled to the first right link module 111, extends downward from the one side coupled to the first right link module 111, and rotates at the one side, which is coupled to the first right link module 111, in the front-rear direction about the left-right direction of the wearer as a central axis; and a second-second right link module 112-2 which has one side coupled to the second-first right link module 112-1 and rotates at the one side, which is coupled to the second-first right link module 112-1, in the front-rear direction about the left-right direction of the wearer as a central axis. Here, wherein a lower surface of the second-second right link module 112-2 may come into contact with the ground. The second-first right link module 112-1 may face the right lower leg of the wearer, and the second-second right link module 112-2 may face the right foot of the wearer. In particular, partial regions of the second-second right link module 112-2 may be in contact with the lower surface of the right sole of the wearer, and at the same time, come into contact with the ground, thereby supporting the right sole of the wearer in the upward direction. The power supply unit may supply the rotational force for rotating the second-first right link module 112-1 and thus may assist the rotational force for rotating the left knee joint of the wearer. On the other hand, the second-second right link module 112-2 may not receive the rotational force from the power supply unit. That is, the second-second right link module 112-2 has a passive joint structure and may rotate passively in response to the movement of the right ankle joint of the wearer.

Also, as illustrated in FIGS. 1 and 2, the second left link module 122 may include: a second-first left link module 122-1 which has one side coupled to the first left link module 121, extends downward from the one side coupled to the first left link module 121, and rotates at the one side, which is coupled to the first left link module 121, in the front-rear direction about the left-right direction of the wearer as a central axis; and a second-second left link module 122-2 which has one side coupled to the second-first left link module 122-1 and rotates at the one side, which is coupled to the second-first left link module 122-1, in the front-rear direction about the left-right direction of the wearer as a central axis. Here, a lower surface of the second-second left link module 122-2 may come into contact with the ground. The second-first left link module 122-1 may face the left lower leg of the wearer, and the second-second left link module 122-2 may face the left foot of the wearer. In particular, partial regions of the second-second left link module 122-2 may be in contact with the lower surface of the left sole of the wearer, and at the same time, come into contact with the ground, thereby supporting the left sole of the wearer in the upward direction. On the other hand, the second-second left link module 122-2 may not receive the rotational force from the power supply unit. That is, the second-second left link module 122-2 has a passive joint structure and may rotate passively in response to the movement of the left ankle joint of the wearer.

As described above, the first right link module 111 and the first left link module 121 may face the right thigh and the left thigh of the wearer, respectively. Thus, as illustrated in FIGS. 1 and 2, the first right link module 111 may extend from the right hip joint of the wearer to the right knee joint of the wearer, and the first left link module 121 may extend from the left hip joint of the wearer to the left knee joint of the wearer.

Also, as described above, the second-first right link module 112-1 and the second-first left link module 122-1 may face the right lower leg and the left lower leg of the wearer, respectively. Thus, the second-first right link module 112-1 may extend from the right knee joint of the wearer to the right ankle joint of the wearer, and the second-first left link module 122-1 may extend from the left knee joint of the wearer to the left ankle joint of the wearer.

Also, as described above, the second-second right link module 112-2 and the second-second left link module 122-2 may face the right foot and the left foot of the wearer. Thus, the second-second right link module 112-2 may extend from the right ankle joint of the wearer to the right sole of the wearer, and the second-second left link module 122-2 may extend from the left ankle joint of the wearer to the left sole of the wearer.

Meanwhile, the wearable device 10 according to the present disclosure may be steered in the left-right direction. More specifically, a steering mode may be provided in the wearable device 10 according to the present disclosure so as to steer the link unit 100 to the left or right.

In particular, according to the present disclosure, the link unit 100 may be steered by rotating the right link unit 110 and the left link unit 120, which rotate solely or primarily in the front-rear direction about the left-right direction as a central axis, without using a separate steering device that rotates the link unit 100 about the up-down direction as a central axis in order to perform the steering mode. A smooth steering movement may be achieved without the wearer twisting the body for steering or without assistance from an assistant.

According to the present disclosure in order to achieve the object described above, during the steering mode, i) the power supply unit may supply power to space the right link unit 110 and the left link unit 120 apart from each other in the front-rear direction, and then ii) the power supply unit supplies power in a direction to cause a unit, which is located relatively forward among the right link unit 110 and the left link unit 120, to be rotated rearward, thereby steering the link unit 100 in the left-right direction.

The principle of the steering mode described above may be understood as follows. That is, in a state in which the right link unit 110 and the left link unit 120 are spaced apart from each other in the front-rear direction, when the power supply unit causes the unit (hereinafter, referred to as a 'front unit'), which is located relatively forward among the right link unit 110 and the left link unit 120, to be rotated rearward, the area of the front unit that comes into contact with the ground is increased, and accordingly, the static friction is increased. At this moment, even though the front unit receives, from the power supply unit, the power to rotate in the rearward direction, the front unit does not actually rotate rearward due to the static friction between the ground and the front unit. Thus, the link unit 100 performs torsional movement to rotate in the left-right direction, and consequently, the link unit 100 may be steered. Hereinafter, various examples of the steering mode of the wearable device 10 according to the present disclosure will be described.

Figure 3:
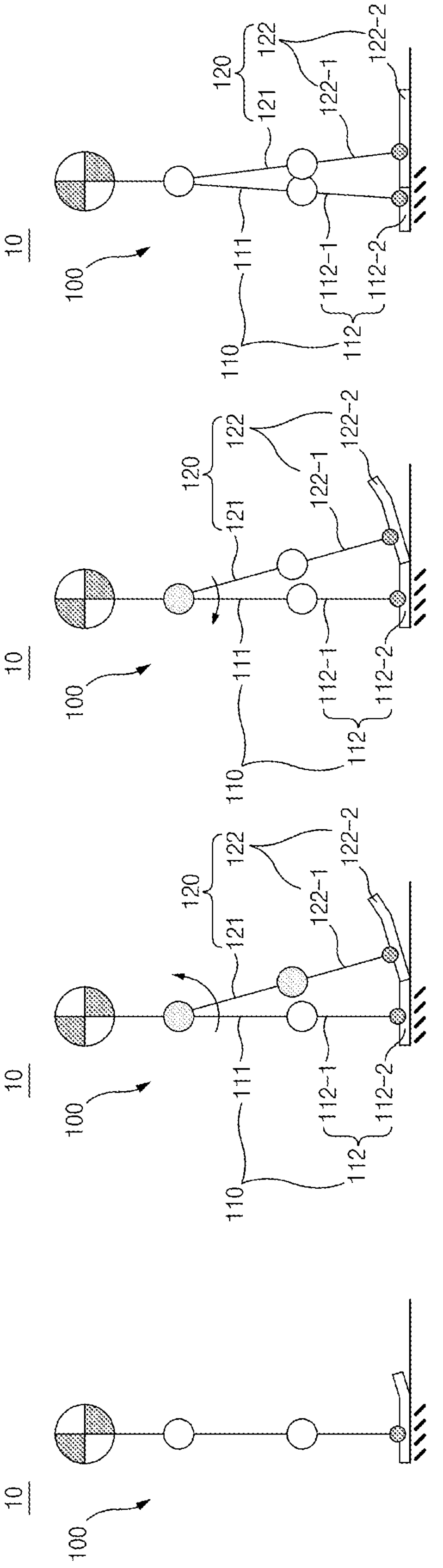
FIG. 3 is a side view illustrating one example of a steering mode of a wearable device according to the present disclosure and showing states of a right steering mode, in a time-series manner, in which the wearable device is steered to the right after a left link unit is disposed forward.
Figure 4:
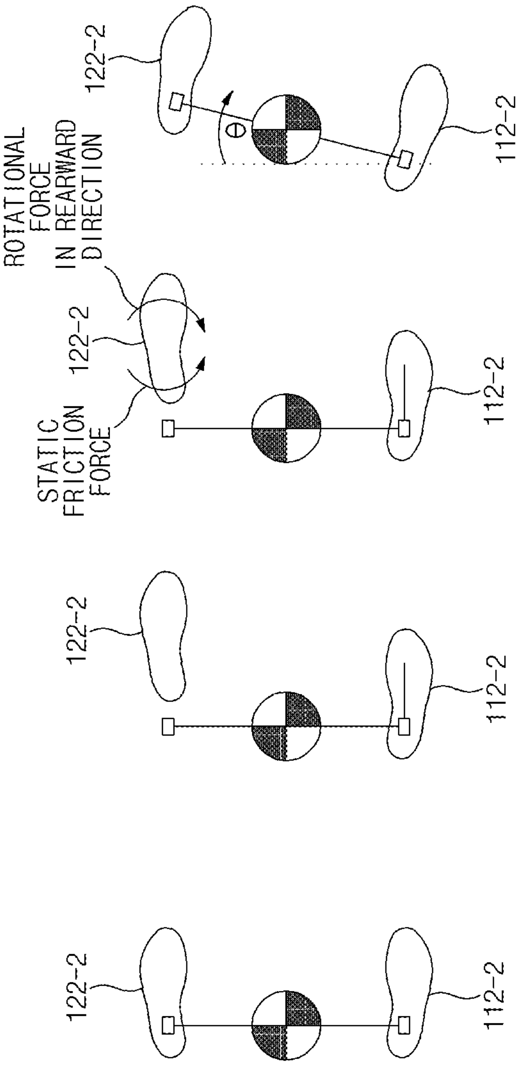
FIG. 4 is a view showing states, in a time-series manner, of portions of a second-second right link module and a second-second left link module, which come into contact with the ground, in the right steering mode of FIG. 3.
Figure 5:
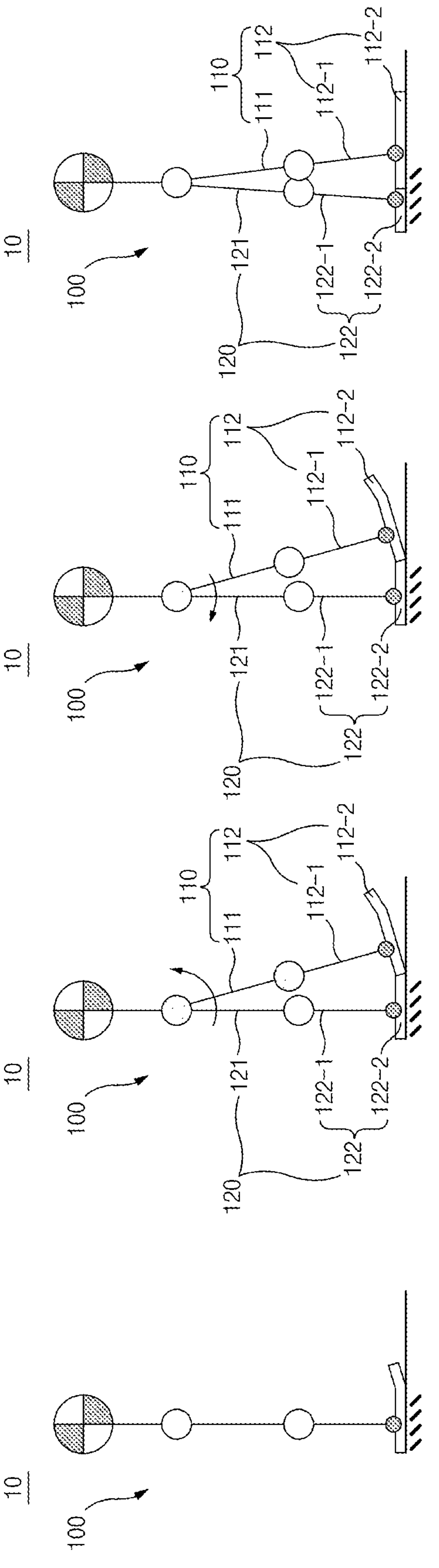
FIG. 5 is a side view illustrating one example of a steering mode of a wearable device according to the present disclosure and showing states of a left steering mode, in a time-series manner, in which the wearable device is steered to the left after a right link unit is disposed forward.
Figure 6:
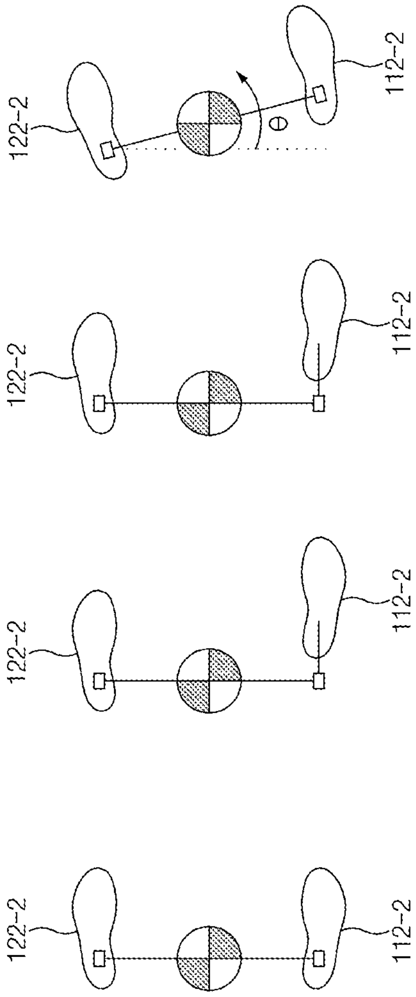
FIG. 6 is a view showing states, in a time-series manner, of portions of a second-second right link module and a second-second left link module, which come into contact with the ground, in the left steering mode of FIG. 5.

FIG. 3 is a side view illustrating one example of a steering mode of a wearable device according to the present disclosure and showing states of a right steering mode, in a time-series manner, in which the wearable device is steered to the right after a left link unit is disposed forward. FIG. 4 is a view showing states, in a time-series manner, of portions of a second-second right link module and a second-second left link module, which come into contact with the ground, in the right steering mode of FIG. 3. FIG. 5 is a side view illustrating one example of a steering mode of a wearable device according to the present disclosure and showing states of a left steering mode, in a time-series manner, in which the wearable device is steered to the left after a right link unit is disposed forward. FIG. 6 is a view showing states, in a time-series manner, of portions of a second-second right link module and a second-second left link module, which come into contact with the ground, in the left steering mode of FIG. 5.

The steering mode described above may include a right steering mode and a left steering mode. The right steering mode may be a mode for steering the link unit 100 to the right, and the left steering mode may be a mode for steering the link unit 100 to the left.

More specifically, according to an example as illustrated in FIGS. 3 and 4, during the right steering mode, i) the power supply unit may provide the power to move the left link unit 120 forward, and then ii) the power supply unit may provide the power in a direction to cause the left link unit 120 to be rotated rearward, thereby steering the link unit 100 to the right. In addition, according to an example as illustrated in FIGS. 5 and 6, during the left steering mode, i) the power supply unit may provide the power to move the right link unit 110 forward, and then ii) the power supply unit may provide the power in a direction to cause the right link unit 110 to be rotated rearward, thereby steering the link unit 100 to the left.

More specifically, according to an example of the present disclosure, during the right steering mode, i) the power supply unit may provide the power to rotate the first left link module 121, thereby moving the left link unit 120 forward, and then ii) the power supply unit provides the power in a direction to cause the first left link module 121 to be rotated rearward about the one side of the first left link module 121, thereby steering the link unit 100 to the right. In addition, according to an example of the present disclosure, during the left steering mode, i) the power supply unit may provide the power to move the right link unit 110 forward, and then ii) the power supply unit may provide the power in a direction to cause the first right link module 111 to be rotated rearward about the one side of the first right link module 111, thereby steering the link unit 100 to the left.

Figure 7:
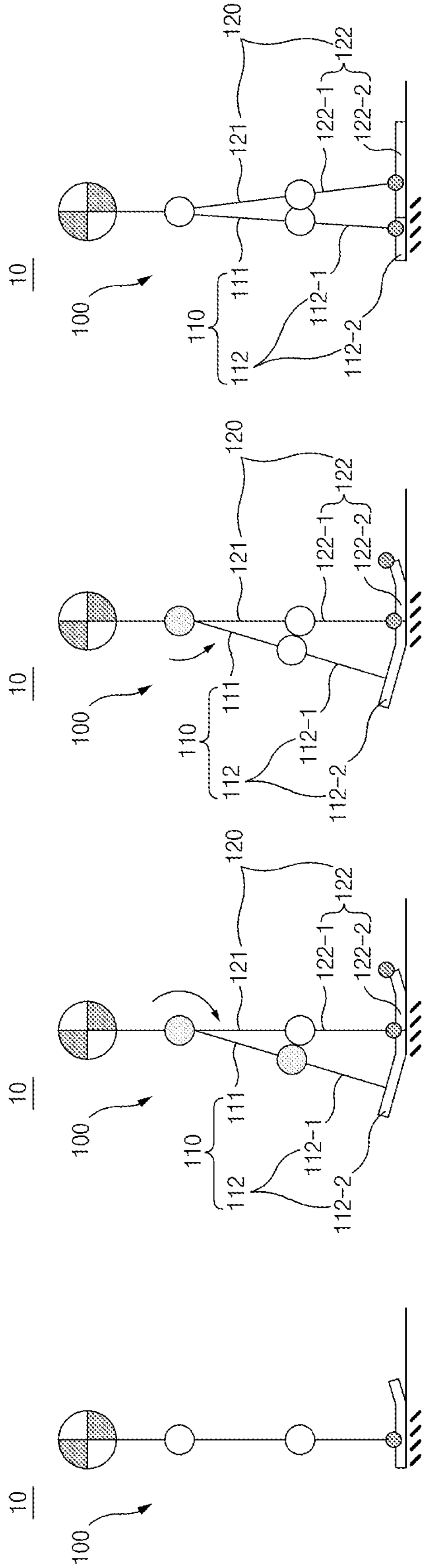
FIG. 7 is a side view illustrating another example of a steering mode of a wearable device according to the present disclosure and showing states of a right steering mode, in a time-series manner, in which the wearable device is steered to the right after a right link unit is disposed rearward.
Figure 8:
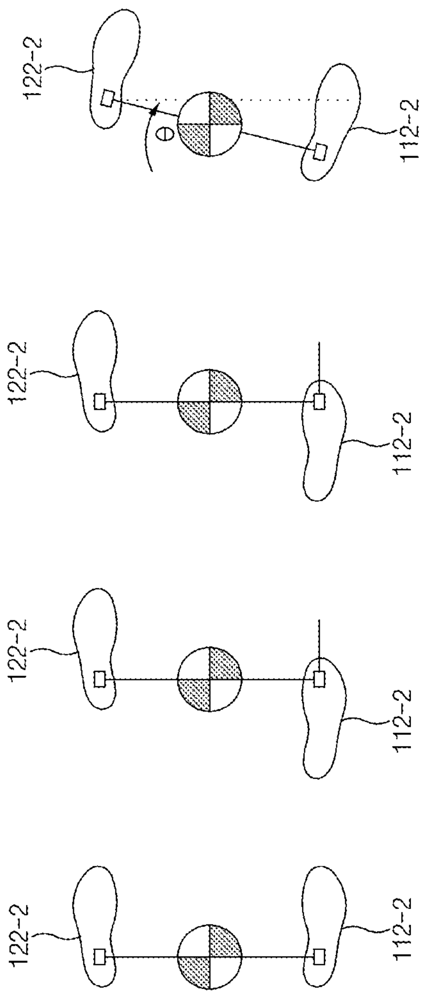
FIG. 8 is a view showing states, in a time-series manner, of portions of a second-second right link module and a second-second left link module, which come into contact with the ground, in the right steering mode of FIG. 7.
Figure 9:
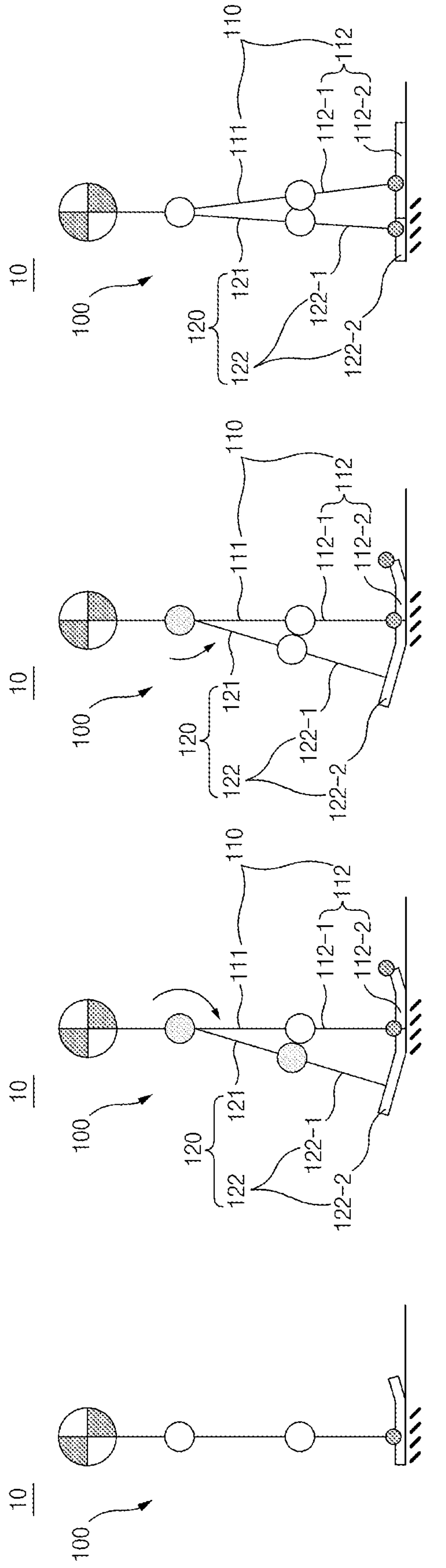
FIG. 9 is a side view illustrating another example of a steering mode of a wearable device according to the present disclosure and showing states of a left steering mode, in a time-series manner, in which the wearable device is steered to the left after a left link unit is disposed rearward.
Figure 10:
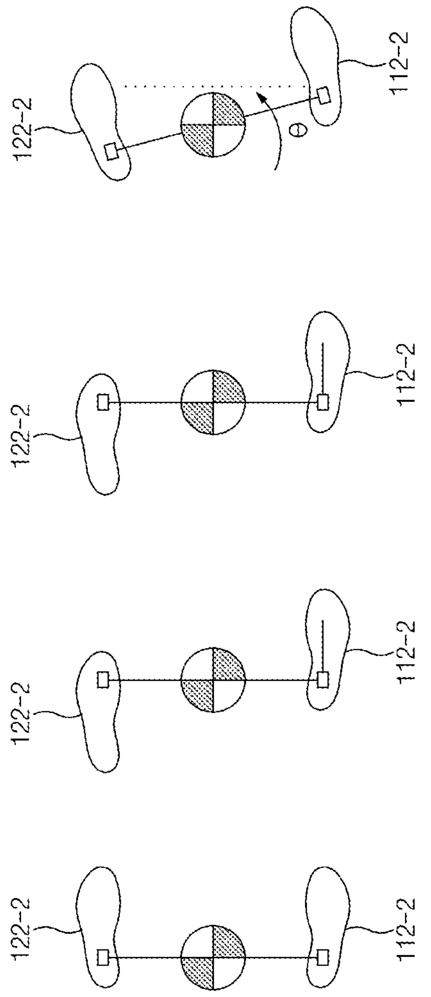
FIG. 10 is a view showing states, in a time-series manner, of portions of a second-second right link module and a second-second left link module, which come into contact with the ground, in the left steering mode of FIG. 9.

FIG. 7 is a side view illustrating another example of a steering mode of a wearable device according to the present disclosure and showing states of a right steering mode, in a time-series manner, in which the wearable device is steered to the right after a right link unit is disposed rearward. FIG. 8 is a view showing states, in a time-series manner, of portions of a second-second right link module and a second-second left link module, which come into contact with the ground, in the right steering mode of FIG. 7. FIG. 9 is a side view illustrating another example of a steering mode of a wearable device according to the present disclosure and showing states of a left steering mode, in a time-series manner, in which the wearable device is steered to the left after a left link unit is disposed rearward. FIG. 10 is a view showing states, in a time-series manner, of portions of a second-second right link module and a second-second left link module, which come into contact with the ground, in the left steering mode of FIG. 9.

Even in another example according to the present disclosure, the steering mode may include a right steering mode and a left steering mode. However, another example according to the present disclosure is different from the one example according to the present disclosure in that, in the above-described steering mode, the link unit 100 is steered after the right link unit 110 or the left link unit 120 is moved rearward.

More specifically, as illustrated in FIGS. 7 and 8, according to another example of the present disclosure, during the right steering mode, i) the power supply unit provides the power to move the right link unit 110 rearward, and then ii) the power supply unit provides the power in a direction to cause the left link unit 120 to be moved rearward, thereby steering the link unit 100 to the right. In addition, as illustrated in FIGS. 9 and 10, according to another example of the present disclosure, during the left steering mode, i) the power supply unit may provide the power to move the left link unit 120 rearward, and then ii) the power supply unit may provide the power in a direction to cause the right link unit 110 to be rotated rearward, thereby steering the link unit 100 to the left.

More specifically, according to another example of the present disclosure, during the right steering mode, i) the power supply unit may provide the power to move the right link unit 110 rearward, and then ii) the power supply unit may provide the power in a direction to cause the first left link module 121 to be rotated rearward about the one side of the first left link module 121, thereby steering the link unit 100 to the right. In addition, according to another example of the present disclosure, during the left steering mode, i) the power supply unit may provide the power to move the left link unit 120 rearward, and then ii) the power supply unit may provide the power in a direction to cause the first right link module 111 to be rotated rearward about the one side of the first right link module 111, thereby steering the link unit 100 to the left.

Meanwhile, referring to FIG. 2, the wearable device 10 may further include a crutch member 200 which has one side gripped by the wearer and the other side coming into contact with the ground. The crutch member 200 may be configured to be supported on the ground by the hand of the wearer wearing the link unit 100, thereby preventing the wearer from falling and assisting the wearer's movement.

Here, the crutch member 200 may include a steering button that performs the above-described steering mode. For example, the steering button may include a right steering button for performing the above-described right steering mode and a left steering button for performing the above-described left steering mode.

Continuing to refer to FIGS. 1 and 2, the wearable device 10 may further include a waist support 300 which surrounds the waist of the wearer and is fixed to the waist of the wearer. Here, each of the one side of the first right link module 111 described above and the one side of the first left link module 121 described above may be rotatably coupled to the waist support 300.

Also, the power supply unit described above may be provided in each of a region in which the first right link module 111 is rotatably coupled to the waist support 300, a region in which the first left link module 121 is rotatably coupled to the waist support 300, the second-first right link module 112-1 is rotatably coupled to the first right link module 111, and the second-first left link module 122-1 is rotatably coupled to the first left link module 121.

According to the present disclosure, provided is the wearable lower extremity assistive device capable of changing directions with components that assist rotational force of the hip and knee joints of a wearer.

Although the present disclosure has been described with specific exemplary implementations and drawings, the present disclosure is not limited thereto, and it is obvious that various changes and modifications may be made by a person skilled in the art to which the present disclosure pertains within the technical idea of the present disclosure and equivalent scope of the appended claims.

What is claimed is:

1. A method for controlling a wearable device, the wearable device including:

a link structure having a shape corresponding to lower extremities of a wearer and configured to rotate along a first direction of the wearer about an axis in a second direction of the wearer; and an electric motor configured to supply power for rotating the link structure, wherein the link structure comprises:

a right link configured to be fixed to a right lower extremity of the wearer and having a lower end configured to contact a ground, and a left link configured to be fixed to a left lower extremity of the wearer and having a lower end configured to contact the ground, wherein the method comprises:

controlling the wearable device to steer the link structure toward the second direction in a steering mode, and in the steering mode, controlling the electric motor to (i) supply power to space the right link and the left link apart from each other in the first direction to thereby cause one of the right link and the left link to position forward relative to the other of the right link and the left link, and (ii) supply power to apply rearward rotation force only to the one of the right link and the left link that is positioned forward in a state in which both the right link and the left link are in contact with the ground to thereby cause a tortional movement of the link structure to steer the link structure toward the second direction.

2. The method of claim 1, wherein the steering mode comprises a right steering mode, and wherein the method further comprises controlling the electric motor to, in the right steering mode, provide power to move the left link forward, and provide power to rotate the left link rearward to thereby steer the link structure to a right direction.

3. The method of claim 1, wherein the steering mode comprises a left steering mode, and wherein the method further comprises controlling the electric motor to, in the left steering mode, provide power to move the right link forward, and provide power to rotate the right link rearward to thereby steer the link structure to a left direction.

4. The method of claim 1, wherein the steering mode comprises a right steering mode, and wherein the method further comprises controlling the electric motor to, in the right steering mode, provide power to move the right link rearward, and provide power to rotate the left link rearward to thereby steer the link structure to a right direction.

5. The method of claim 1, wherein the steering mode comprises a left steering mode, and wherein the method further comprises controlling the electric motor to, in the left steering mode, provide power to move the left link rearward and provide power to rotate the right link rearward to thereby steer the link structure to a left direction.

6. The method of claim 1, wherein the right link comprises:

a first right link module having a first right side facing a right hip joint of the wearer, extending downward from the first right side, and configured to rotate at the first right side of the first right link module in the first direction about the axis in the second direction of the wearer; and a second right link module having a second right side coupled to the first right link module, extending downward from the second right side coupled to the first right link module, and configured to rotate at the second right side of the second right link module in the first direction about the second direction of the wearer, and wherein the left link comprises:

a first left link module having a first left side facing a left hip joint of the wearer, extending downward from the first left side, and configured to rotate at the first left side of the first left link module in the first direction about the axis in the second direction of the wearer, and a second left link module having a second left side coupled to the first left link module, extending downward from the second left side coupled to the first left link module, and configured to rotate at the second left side of the second left link module in the first direction about the axis in the second direction of the wearer.

7. The method of claim 6, wherein the steering mode comprises a right steering mode, and wherein the method further comprises controlling the electric motor to, in the right steering mode, provide power to move the left link forward, and provide power to rotate the first left link module rearward about the first left side of the first left link module, thereby steering the link structure to a right direction.

8. The method of claim 6, wherein the steering mode comprises a left steering mode, and wherein the method further comprises controlling the electric motor to, in the left steering mode, provide power to move the right link forward, and provide power to rotate the first right link module rearward about the first right side of the first right link module, thereby steering the link structure to a left direction.

9. The method of claim 6, wherein the steering mode comprises a right steering mode, and wherein the method further comprises controlling the electric motor to, in the right steering mode, provide power to move the right link rearward, and provide power to rotate the first left link module rearward about the first left side of the first left link module, thereby steering the link structure to a right direction.

10. The method of claim 6, wherein the steering mode comprises a left steering mode, and wherein the method further comprises controlling the electric motor to, in the left steering mode, provide power to move the left link rearward, and provide power to rotate the first right link module rearward about the first left side of the first right link module, thereby steering the link structure to a left direction.

11. The method of claim 6, wherein the second right link module comprises:

a second-first right link module having one side coupled to the first right link module, extending downward from the one side coupled to the first right link module, and configured to rotate at the one side of the second-first right link module in the first direction about the axis in the second direction of the wearer; and a second-second right link module having one side coupled to the second-first right link module and configured to rotate at the one side of the second-second right link module in the first direction about the axis in the second direction of the wearer, and wherein a lower surface of the second-second right link module is configured to contact the ground.

12. The method of claim 11, wherein the second left link module comprises:

a second-first left link module having one side coupled to the first left link module, extending downward from the one side coupled to the first left link module, and configured to rotate at the one side of the second-first left link module in the first direction about the second direction of the wearer; and a second-second left link module which has one side coupled to the second-first left link module and rotates at the one side of the second-second left link module in the first direction about the second direction of the wearer, wherein a lower surface of the second-second left link module is configured to contact the ground.

13. The method of claim 12, wherein the first right link module extends from the right hip joint of the wearer to a right knee joint of the wearer, wherein the first left link module extends from the left hip joint of the wearer to a left knee joint of the wearer, wherein the second-first right link module extends from the right knee joint of the wearer to a right ankle joint of the wearer, wherein the second-first left link module extends from the left knee joint of the wearer to a left ankle joint of the wearer, wherein the second-second right link module extends from the right ankle joint of the wearer to a right sole of the wearer, and wherein the second-second left link module extends from the left ankle joint of the wearer to a left sole of the wearer.

14. The method of claim 1, further comprising a crutch member having a first side configured to be gripped by the wearer and a second side configured to contact the ground, wherein the crutch member comprises a steering button configured to perform the steering mode.

15. The method of claim 1, wherein the first direction is a front-rear direction of the wearer, and the second direction is a left-right direction of the wearer.

16. The method of claim 1, wherein the first direction is perpendicular to the second direction.

17. The method of claim 1, further comprising controlling the electric motor to, in the steering mode, perform operation (i) before operation (ii).

* * * * *